United States Patent
Bent et al.

(10) Patent No.: US 9,959,238 B1
(45) Date of Patent: May 1, 2018

(54) MESSAGE PASSING AMONG INTERDEPENDENT PARALLEL PROCESSES USING A SHARED MEMORY

(71) Applicant: EMC IP Holding Company LLC, Hopkinton, MA (US)

(72) Inventors: John M. Bent, Los Alamos, NM (US); Sorin Faibish, Newton, MA (US); James M. Pedone, Jr., West Boylston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 489 days.

(21) Appl. No.: 14/580,534

(22) Filed: Dec. 23, 2014

(51) Int. Cl.
*G06F 3/00* (2006.01)
*G06F 13/42* (2006.01)
*G06F 13/28* (2006.01)
*G06F 9/54* (2006.01)

(52) U.S. Cl.
CPC ............ *G06F 13/4221* (2013.01); *G06F 9/54* (2013.01); *G06F 13/28* (2013.01)

(58) Field of Classification Search
USPC ......................................................... 719/313
See application file for complete search history.

(56) References Cited

U.S. PATENT DOCUMENTS

| | | | | |
|---|---|---|---|---|
| 5,923,832 A * | 7/1999 | Shirakihara | ......... | G06F 11/1438 712/228 |
| 7,987,229 B1 * | 7/2011 | Kinne | ..................... | G06F 13/28 709/200 |
| 2012/0117361 A1 * | 5/2012 | Archer | ..................... | G06F 9/52 712/228 |

OTHER PUBLICATIONS

Hedges et al., "Parallel File System Testing for the Lunatic Fringe: the care and feeding of restless I/O Poer Users" Proceedings of the 22nd IEEE 13th NASA Goddard Conference on Mass Storage Systems and Technologies (2005).
Ananthanarayanan et al., "Cloud analytics: Do we really need to reinvent the storage stack?", https://www.usenix.org/legacy/event/hotcloud09/tech/full_papers/ananthanarayanan.pdf, downloaded Dec. 18, 2014.
Tantisiriroj et al., "Crossing the Chasm: Sneaking a Parallel File System into Hadoop",Carnegie Mellon Parallel Data Laboratory, (Nov. 2008).
Bert Latamore, "EMC's DSSD purchase legitimizes low-latency storage", Silicon Angle (May 7, 2014).
Evan Jones, "Gigabit Ethernet Latency with Intel's 1000/Pro Adapters (e1000)", (Nov. 7, 2008) http://www.evanjones.ca/ethernet-latency.html.

(Continued)

*Primary Examiner* — Kenneth Tang
(74) *Attorney, Agent, or Firm* — Ryan, Mason & Lewis, LLP (57) ABSTRACT

Message passing is provided among a plurality of interdependent parallel processes using a shared memory. Inter-process communication among a plurality of interdependent processes executing on a plurality of compute nodes is performed by obtaining a message from a first process for a second process; and storing the message in a memory location of a Peripheral Component Interconnect Express (PCIE)-linked storage device, wherein the second process reads the memory location to obtain the message. The message is optionally persistently stored in the PCIE-linked storage device for an asynchronous checkpoint until the message is no longer required for an asynchronous restart.

20 Claims, 5 Drawing Sheets

(56) References Cited

OTHER PUBLICATIONS

"MPI Performance Topics", https://computing.llnl.gov/tutorials/mpi_performance/, (Jan 23, 2014).
Riesen et al., "Alleviating Scalability Issues of Checkpointing Protocols", SC12, IEEE, Salt Lake City, Utah (Nov. 10-16, 2012).
Jiang et al., "High Performance MPI-2 One-Sided Communication over InfiniBand", http://mvapich.cse.ohio-state.edu/static/media/publications/abstract/jiang-ccgrid04.pdf.
"LAM—introduction to Local Area Multicomputer (LAM)"; http://yclept.ucdavis.edu/Beowulf/notes/man-lam/lam.man.html, downloaded Dec. 15, 2014.
"OpenMP", http://en.m.wikipedia.org/wiki/OpenMP, downloaded Dec. 11, 2014.

* cited by examiner

```
// unmodified MPI applications call MPI_Send and MPI_Receive as normal
// the internal library implementations for MPI_Send and MPI_Receive change,
// as shown below int MPI_Send(const void *buf
          int count, MPI_Datatype datatype, int dest, int tag,
          MPI_Comm comm)
{
  int my_rank = MPI_Comm_rank(comm);
  lock_mailbox(my_rank,dest);
  uint_64 mailbox = mailbox_address(my_rank,dest);
  buffer = dssd_get(mailbox,mailbox_sz);
  place_message(mailbox,buf,count,datatype);
  unlock_mailbox(my_rank,dest);
} int MPI_Receive(void *buf,
          int count, MPI_Datatype datatype, int sender, int tag,
          MPI_Comm comm)
{
  int my_rank = MPI_Comm_rank(comm);
  int received = false;
  while(!received) {
          // keep trying to receive message until it appears, in case receiver
          tries to receive message before sent lock_mailbox(sender,my_rank);
          // note that address formation is reversed from MPI_Send
          uint_64 mailbox = mailbox_address(sender,my_rank);
          buffer = dssd_get(mailbox,mailbox_sz);
          received = copy_message(mailbox,buf,count,datatype);
          unlock_mailbox(sender,my_rank);
          microsleep(1);
  }
}
```

FIG. 4A

```
// a helper function 410 to read a message from a mailbox
int copy_message(mailbox,buf,count,datatype) {
    // read the header information about the messages in the mailbox queue
    // see if there is a message waiting
    // if no message, return false
    // if there is a message, copy it into the buffer, modify the header to clear the message,
    // and return true
}

// a helper function 420 to put a message into a mailbox
int place_message(uint_64 addr,const void *buf, int count, MPL_Datatype datatype) {
    // first compute the total size of the message: count * sizeof(datatype)
    // then consult metadata in the header of the mailbox about current mailbox
    // contents // append this message to the message queue already in the mailbox if it fits
    // if it doesn't fit, then instead use a pointer to a malloced buffer elsewhere
    // model this after how file system inodes work:
    // http://en.wikipedia.org/wiki/Inode
    // then update the header to reflect the newly inserted message
}

// a helper function 430 to unlock the mailbox when done accessing
int unlock_mailbox(int sender, int receiver) {
    uint_64 addr = lock_address(sender,receiver);
    dssd_set(addr,0);
}
```

```
// a helper function 460 to ensure that the sender and receiver have
// mutual access to the virtual mailbox
int lock_mailbox(int sender, int receiver) {
        // each pair of sender and receiver have a unique address
        uint_64 addr = lock_address(sender,receiver);
        while(1) {
           locked = dssd_test_and_set(addr,1);
           if (!locked) microsleep(1);
           else break;
        }
}
// a helper function 470 to get the lock address
uint_64 lock_address(int sender, int receiver) {
   uint_64 addr = sender;
   addr = ((uint64_t)sender<< 32) | receiver;
   return addr;
}
// a helper function 480 to get the mailbox address
// currently the mailbox address and the lock address are the same
// use different addresses to ensure no mailbox conflicts
uint_64 mailbox_address(int sender, int receiver) {
   return lock_address(sender,receiver);
}
```

MESSAGE PASSING AMONG INTERDEPENDENT PARALLEL PROCESSES USING A SHARED MEMORY

FIELD

The field relates generally to inter-process communication among a plurality of interdependent parallel processes.

BACKGROUND

Many compute sites support a combination of enterprise and High Performance Computing (HPC) applications. HPC workloads tend to be comprised of a plurality of interdependent parallel processes that must run synchronously in time due to the large amount of inter-process communication. Typical HPC workloads execute on clusters of compute nodes interconnected by a low-latency network. Enterprise workloads, on the other hand, tend to be independent tasks that do not require a significant amount of inter-process communication.

Unfortunately, the compute infrastructure historically employed for an enterprise site does not closely resemble the compute infrastructure historically employed for HPC sites. Therefore, distinct compute sites have typically been employed for each workload type. It is anticipated, however, that HPC and enterprise computing systems will converge. For typical compute systems, there is significant pressure to support a variety of services using a shared converged infrastructure.

In order for HPC applications to be successfully deployed in an enterprise compute infrastructure, however, a need exists for improved techniques for inter-process communication among the plurality of interdependent parallel processes. A further need exists for inter-process communication among the plurality of interdependent parallel processes using a shared memory in an enterprise environment.

SUMMARY

Illustrative embodiments of the present invention provide for message passing among a plurality of interdependent parallel processes using a shared memory. In one embodiment, inter-process communication among a plurality of interdependent processes executing on a plurality of compute nodes is performed by obtaining a message from a first process for a second process; and storing the message in a memory location of a Peripheral Component Interconnect Express (PCIE)-linked storage device, wherein the second process reads the memory location to obtain the message.

In at least one exemplary embodiment, the memory location comprises a unique value for the first process and the second process. The memory location is optionally locked until the second process reads the memory location to obtain the message. For larger messages, the memory location optionally stores an offset to a second memory location where at least a portion of the message is stored.

In a further exemplary embodiment, the message is persistently stored in the PCIE-linked storage device for an asynchronous checkpoint until the message is no longer required for an asynchronous restart.

The illustrative embodiments described herein provide significant improvements relative to conventional arrangements. In some of these embodiments, the duplication of conventional message logging schemes that must send and store messages is removed by sending messages via a shared storage medium.

DETAILED DESCRIPTION

Aspects of the present invention provide improved techniques for inter-process communication among a plurality of interdependent parallel processes executing on a plurality of compute nodes. One aspect of the invention provides Message Passing Interface (MPI) communications among interdependent parallel processes using a shared memory in an enterprise environment. While exemplary embodiments of the present invention employ low-latency MPI communications and the associated MPI application programming interface (API) and library, other message passing paradigms can be employed, as would be apparent to a person of ordinary skill in the art.

In addition, while exemplary embodiments of the present invention employ Peripheral Component Interconnect Express (PCIE) communications, other low latency communications can be employed, as would be apparent to a person of ordinary skill in the art. For example, PCIE-linked flash storage devices, such as DSSD™ flash storage devices from EMC Corp., provide a latency of message passing of approximately 50 microseconds, which may be lower than general Ethernet latency of around 100 microseconds (which may be even slower for MPI message passing over Ethernet).

Generally, as used herein, low-latency communications employ a single socket, while high-latency communications employ multiple sockets. PCIe is a communication network within a single socket and is therefore low latency. DSSD™ flash storage devices therefore create a cross socket communications channel that operates within socket latencies.

One aspect of the invention employs an enterprise infrastructure with one or more PCIE-linked flash storage devices, such as DSSD™ flash storage devices, to implement an MPI message passing API and library such that HPC workloads can run efficiently on an enterprise architecture.

In this manner, the messages are stored persistently as they are passed through the exemplary PCIE-linked storage device. Thus, according to another aspect of the invention, the message logging of the present invention permits asynchronous checkpointing. In this way, each process can selectively checkpoint itself independently from other processes. Asynchronous checkpointing normally requires that the messages passed between the asynchronous checkpoints must be stored persistently. The disclosed message passing implementation via the exemplary PCIE-linked storage device, however, already implicitly persistently stores passed messages. To enable this, applications must merely not immediately delete messages upon their receipt but delay the removal until the messages are no longer needed for asynchronous restart.

Additional aspects of the invention extend existing MPI libraries with a new communications paradigm, thereby augmenting their existing support for traditional communication mechanisms, such as Infiniband and Ethernet, with an implementation that uses PCIE-linked storage devices for message passing. For example, DSSD™ flash storage devices are an example of PCIE-linked flash storage devices. Exemplary pseudo code for the extended MPI libraries to implement aspects of the invention is discussed below in conjunction with FIGS. 3 through 5.

Figure 1:
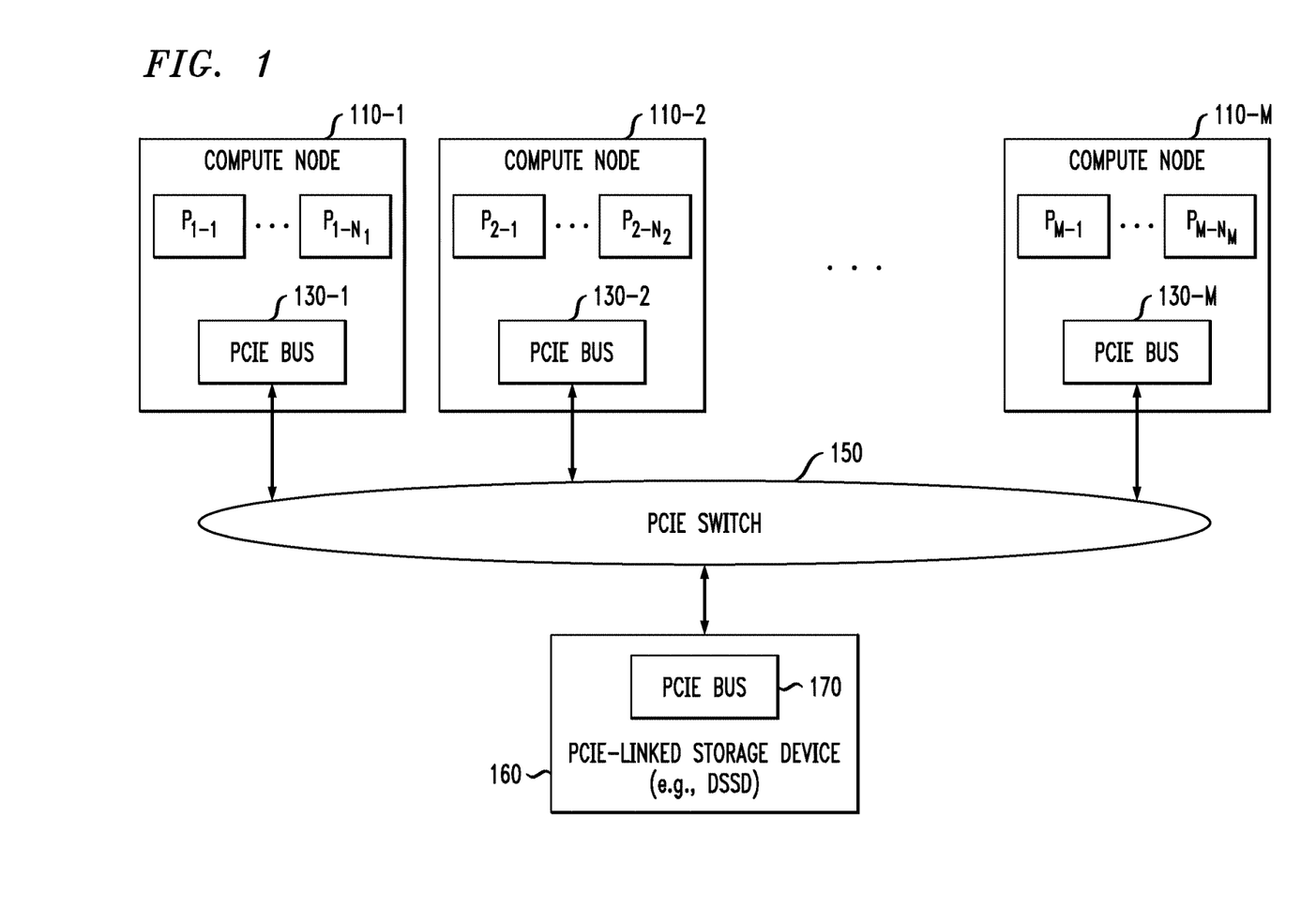
FIG. 1 illustrates a plurality of interdependent parallel processes executing on a plurality of compute nodes and communicating by means of a shared memory in accordance with aspects of the invention.

FIG. 1 illustrates a plurality of interdependent parallel processes $P_{1-1}$ through $P_{M-N_M}$ executing on a plurality of compute nodes 110-1 through 110-M. It is noted that the first index for each process indicates the compute node 110 upon which the process executes and the second index for each process indicates the rank of the process on the respective compute node 110. The number of processes executing on each compute node 110 can vary. Each compute node 110 comprises a PCIE bus 130-1 through 130-M. The interdependent parallel processes communicate with one another using the respective PCIE bus 130 and a PCIE switch 150, as discussed further below.

One or more PCIE-linked storage devices 160, such as a PCIE-linked DSSD™ flash storage device from EMC Corp., are connected to the PCIE switch 150 by means of a PCIE bus 170.

Figure 2:
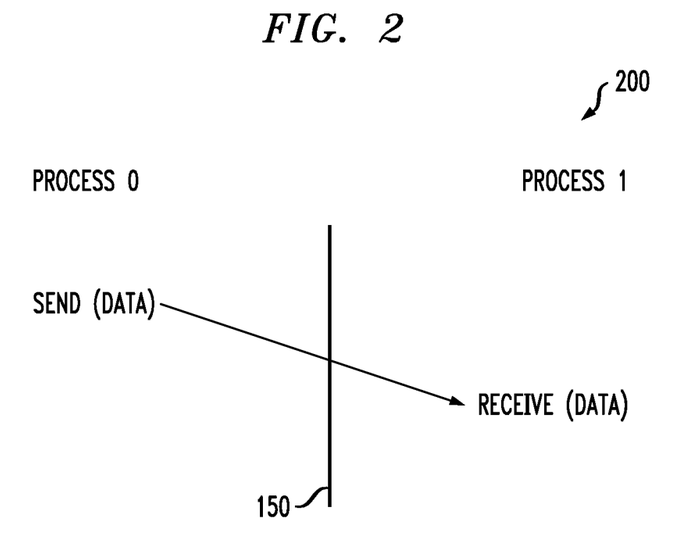
FIG. 2 illustrates message passing among two exemplary processes.

FIG. 2 illustrates message passing 200 among two exemplary processes 0 and 1 over the PCIE switch 150 of FIG. 1. In the exemplary embodiment of FIG. 2, process 0 sends data and process 1 receives data, making the exchange of data cooperative. Data must both be explicitly sent and received by the respective process. A change in the memory of the receiver process 1 is made with the participation of the receiver process 1.

In accordance with aspects of the present invention, synchronous messaging is implemented by creating a memory offset in the exemplary PCIE-linked storage device 160 using a (sender_id, receiver_id) pair. For small messages, the messages can be stored directly at the location identified by the memory offset. Larger messages can optionally employ an indirection in which the target location stores an offset to the larger message.

For asynchronous messaging, each receiver can have a mailbox address into which asynchronous messages can be stored. Thus, there is no need for a caller to hold the memory copy or for the MPI library to copy and buffer the message. Instead, since the message passing implementation is done by storing the message into the exemplary PCIE-linked storage device 160, there is no need for the caller, or the MPI library on behalf of the caller, to store the message.

Local Area Multicomputer (LAM) is an exemplary MPI programming environment and development system for heterogeneous computers on a network. LAM/MPI is an existing implementation of the MPI communication standard. LAM/MPI allows a plurality of compute nodes forming a computer cluster to act as a single parallel computing resource. For a more detailed discussion of LAM, see, for example, http://yclept.ucdavis.edu/Beowulf/notes/man-lam/lam.man.html, incorporated by reference herein.

As noted above, aspects of the invention extend existing MPI libraries, such as LAM, to provide an implementation that uses shared memory in the form of PCIE-linked storage devices for message passing. In particular, aspects of the invention provide new implementations for MPI-Send and MPI-Receive functions in the exemplary LAM/MPI implementation. The exemplary MPI-Send function writes a message to the exemplary PCIE-linked storage device 160 and the exemplary MPI-Receive function reads a stored message from the exemplary PCIE-linked storage device 160.

Figure 3:
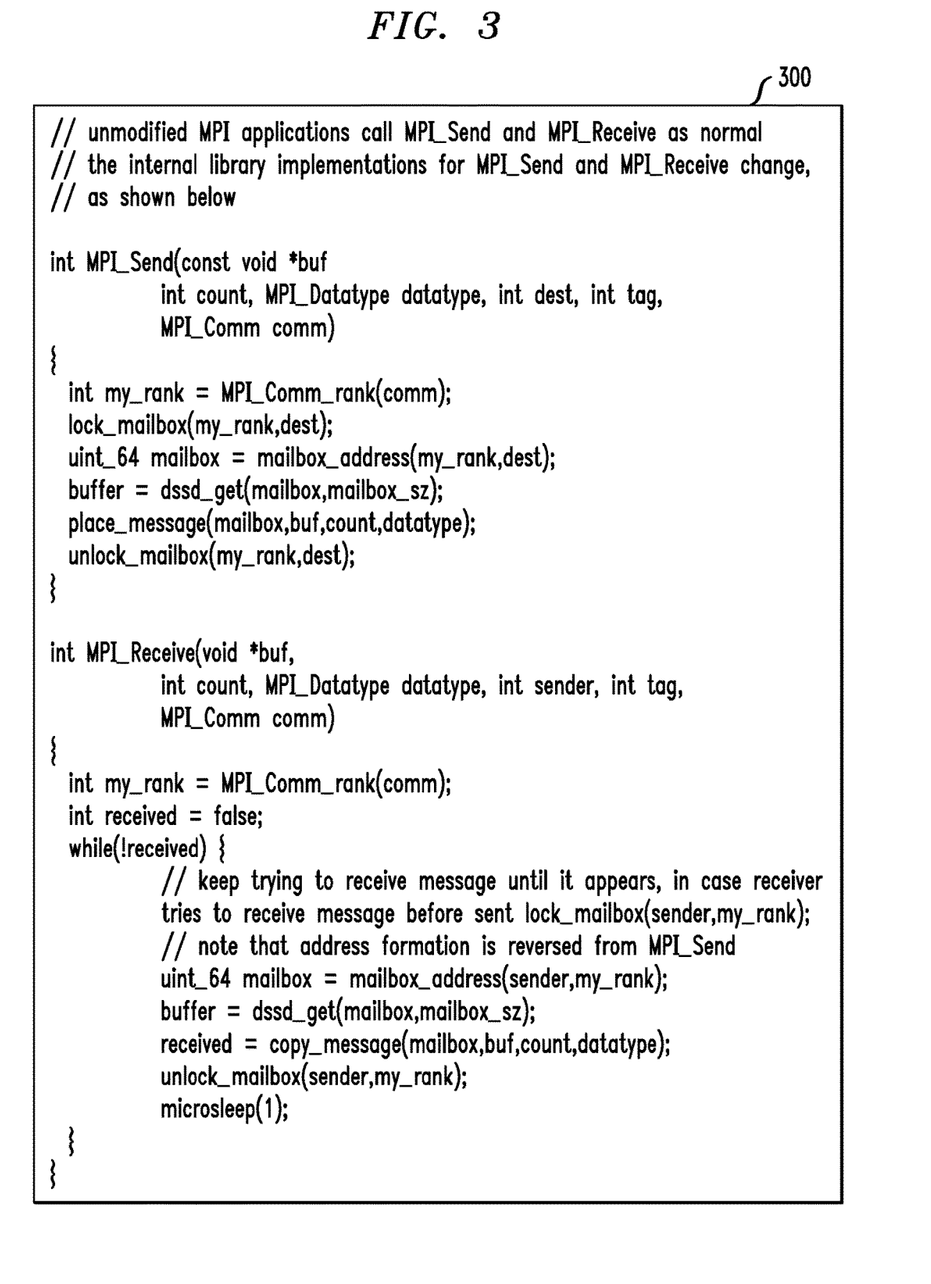
FIG. 3 illustrates exemplary pseudo code for MPI-Send and MPI-Receive functions incorporating aspects of the present invention.
Figure 4A:
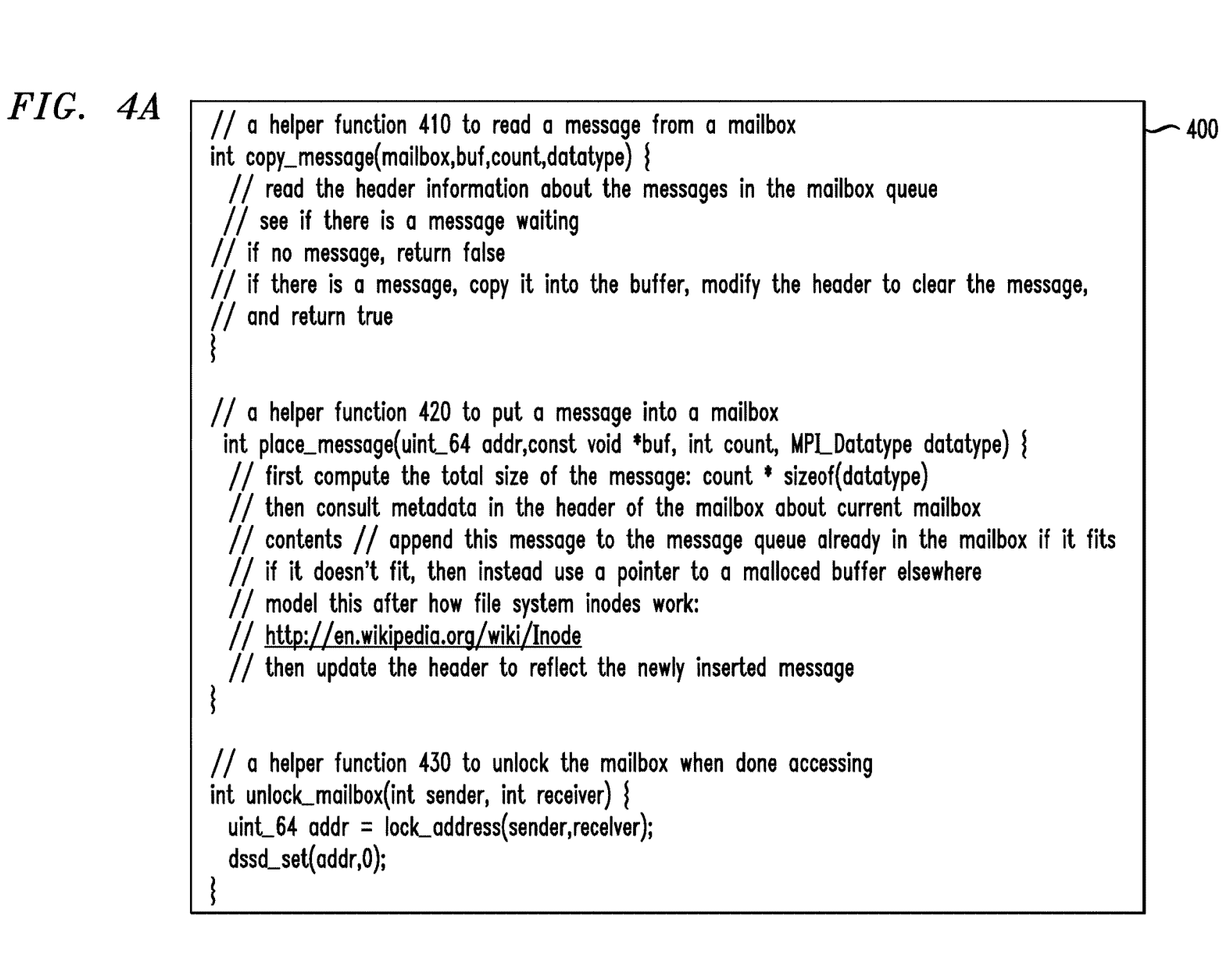
FIGS. 4A and 4B illustrate exemplary pseudo code for helper functions for the MPI-Send and MPI-Receive functions of FIG. 3.
Figure 4B:
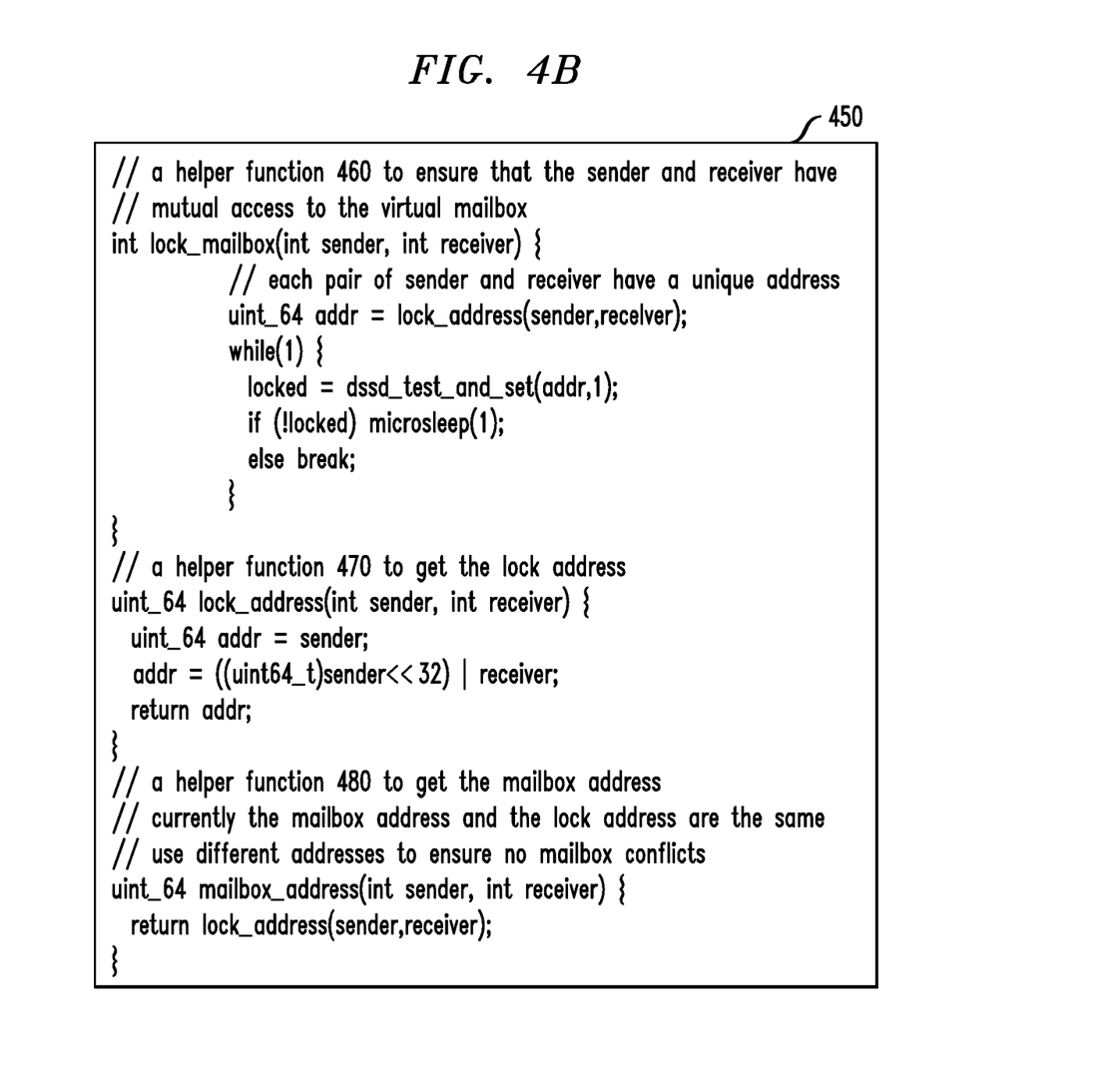

FIG. 3 illustrates exemplary pseudo code 300 for MPI-Send and MPI-Receive functions incorporating aspects of the present invention. The exemplary pseudo code 300 allows existing (i.e., unmodified) applications to call MPI-Send and MPI-Receive functions as in the past, and the internal library implementations for MPI_Send and MPI_Receive that are trigged by the function calls are shown in FIG. 3.

As shown in FIG. 3, the exemplary MPI_Send function determines the rank of the sending process using a my_rank process, locks the allocated mailbox and places the message in a buffer associated with the allocated mailbox on the exemplary PCIE-linked storage device 160. The exemplary MPI_Receive function determines the rank of the receiving process using the my_rank process and tries to receive the stored message until it appears (in case the receiver tries to receive the message before it is sent). In addition, the exemplary MPI_Receive function locks the allocated mailbox and reads the message from the allocated mailbox on the exemplary PCIE-linked storage device 160 and copies it in a buffer back to the receiving process.

FIGS. 4A and 4B illustrate exemplary pseudo code 400 and 450, respectively, for helper functions for the MPI-Send and MPI-Receive functions of FIG. 3. As shown in FIG. 4A, the exemplary pseudo code 400 comprises a copy_message helper function 410 to read a message from a mailbox that is called by the MPI-Receive function of FIG. 3.

In addition, the exemplary pseudo code 400 comprises a place_message helper function 420 to put a message into a mailbox that is called by the MPI-Send function of FIG. 3. The exemplary pseudo code 400 also comprises an unlock_mailbox helper function 430 to unlock the mailbox when the message passing is complete.

As shown in FIG. 4B, the exemplary pseudo code 450 comprises a lock_mailbox helper function 460 to ensure that the sender and receiver processes have mutual access to the virtual mailbox.

In addition, the exemplary pseudo code 450 comprises a lock_address helper function 470 to obtain the lock address. The exemplary pseudo code 450 also comprises a mailbox_address helper function 480 to obtain the mailbox address using different addresses to ensure no mailbox conflicts. Thus, the mailbox_address helper function 480 obtains a unique value for each sender/receiver pair.

Among other benefits, the passing of messages through the PCIE switch 150 instead of the network switch (not shown in FIG. 1), reduces the bandwidth required for a low-latency network. In addition, while previous message logging schemes have duplicated the messages in order to send them as well as to store them, aspects of the present invention remove the duplication by sending them via the storage medium.

In addition, parallel program resilience to failure has traditionally been achieved through an expensive state dump mechanism in which the parallel program imposes an expensive barrier or fence to quiesce the network and then using the storage system in an extremely inefficient bulk synchronous large data transfer. Alternatives to this checkpoint/restart resilience method include message logging which is expensive both in terms of latency and capacity costs. The message logging done heretofore duplicates the messaging by both sending it through the network as well as storing the message in a persistent storage. By doing message passing natively through the persistent storage in accordance with aspects of the invention, the duplication is removed.

The compute nodes 110-1 through 110-M (or portions thereof), comprising a processor, memory and network interface components as described above, are examples of what is more generally referred to herein as a "processing device." Each of the devices herein may similarly be implemented as a processing device comprising a processor, memory and network interface components. Thus, one or more of the exemplary compute nodes 110-1 through 110-M in the exemplary enterprise environment comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein may be viewed as examples of what are more generally referred to as "computer program products" storing executable computer program code. Also optionally included in one or more of the exemplary compute nodes 110 is network interface circuitry. The network interface circuitry allows the exemplary compute nodes 110 to communicate over a network (not shown in FIG. 1) with other devices. The network interface circuitry may comprise, for example, one or more conventional transceivers.

CONCLUSION

It is to be appreciated that the particular operations and associated messaging illustrated herein are exemplary only, and numerous other types of operations and messaging may be used in other embodiments.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the exemplary enterprise environment of the present invention. Such components can communicate with other elements of the exemplary enterprise environment over any type of network or other communication media.

As indicated previously, components of an exemplary enterprise environment as disclosed herein can be implemented at least in part in the form of one or more software programs stored in memory and executed by a processor of a processing device. A memory having such program code embodied therein is an example of what is more generally referred to herein as a "computer program product."

The exemplary enterprise environment or portions thereof may be implemented using one or more processing platforms each comprising a plurality of processing devices. Each such processing device may comprise processor, memory and/or network interface components.

As indicated above, message passing using shared memories such as that described herein can be implemented at least in part in the form of one or more software programs stored in memory and executed by a processor of a processing device such as a computer or server. A memory or other storage device having such program code embodied therein is an example of what is more generally referred to herein as a "computer program product." Certain system components are implemented using a combination of software and hardware.

It should again be emphasized that the above-described embodiments of the invention are presented for purposes of illustration only. Many variations and other alternative embodiments may be used. For example, the disclosed techniques are applicable to a wide variety of other types and arrangements of compute nodes and interrelated processes that can benefit from the message passing functionality as described herein. Also, the particular configurations of system and device elements shown in FIG. 1 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method for inter-process communication among a plurality of interdependent processes executing on a plurality of compute nodes, comprising:
    obtaining a message by means of a Peripheral Component Interconnect Express (PCIE) network interconnecting a plurality of compute nodes, wherein said message is from a first process executing on a first compute node of the plurality of compute nodes for a second process executing on a distinct second compute node of the plurality of compute nodes; and
    storing said message in a predefined persistent memory location of a PCIE-linked persistent storage device that is distinct from said first compute node and said second compute node, wherein said second process reads said predefined persistent memory location using a PCIE communication to obtain said message from said predefined persistent memory location.

2. The method of claim 1, wherein said first process employs a Message Passing Interface (MPI)-Send function of an MPI application programming interface (API) to send said message.

3. The method of claim 2, wherein said second process employs a MPI-Receive function of said MPI API to read said message.

4. The method of claim 1, wherein said first process and said second process employ a PCIE bus on a respective compute node where said first process and said second process execute.

5. The method of claim 1, wherein said PCIE-linked storage device employs a PCIE bus on said PCIE-linked storage device.

6. The method of claim 1, wherein said predefined persistent memory location comprises a unique value for said first process and said second process.

7. The method of claim 1, wherein said predefined persistent memory location is locked until said second process reads said predefined persistent memory location to obtain said message.

8. The method of claim 1, wherein said predefined persistent memory location stores an offset to a second memory location where at least a portion of said message is stored.

9. The method of claim 1, wherein said message is persistently stored in said PCIE-linked persistent storage device for an asynchronous checkpoint.

10. The method of claim 9, wherein said message is persistently stored in said PCIE-linked persistent storage device until said message is no longer required for an asynchronous restart.

11. The method of claim 1, wherein said first and second processes comprise portions of a High Performance Computing (HPC) workload in an enterprise environment.

12. A non-transitory machine-readable recordable storage medium, wherein one or more software programs when executed by one or more processing devices implement the following steps:

obtaining a message by means of a Peripheral Component Interconnect Express (PCIE) network interconnecting a plurality of compute nodes, wherein said message is from a first process executing on a first compute node of the plurality of compute nodes for a second process executing on a distinct second compute node of the plurality of compute nodes; and storing said message in a predefined persistent memory location of a PCIE-linked persistent storage device that is distinct from said first compute node and said second compute node, wherein said second process reads said predefined persistent memory location using a PCIE communication to obtain said message from said predefined persistent memory location.

13. A system for inter-process communication among a plurality of interdependent processes executing on a plurality of compute nodes, comprising:

a memory; and at least one processing device configured to:

obtain a message by means of a Peripheral Component Interconnect Express (PCIE) network interconnecting a plurality of compute nodes, wherein said message is from a first process executing on a first compute node of the plurality of compute nodes for a second process executing on a distinct second compute node of the plurality of compute nodes; and store said message in a predefined persistent memory location of a PCIE-linked persistent storage device that is distinct from said first compute node and said second compute node, wherein said second process reads said predefined persistent memory location using a PCIE communication to obtain said message from said predefined persistent memory location.

14. The system of claim 13, wherein said first process employs a Message Passing Interface (MPI)-Send function of an MPI application programming interface (API) to send said message and wherein said second process employs a MPI-Receive function of said MPI API to read said message.

15. The system of claim 13, wherein said first process and said second process employ a PCIE bus on a respective compute node where said first process and said second process execute.

16. The system of claim 13, wherein said PCIE-linked storage device employs a PCIE bus on said PCIE-linked storage device.

17. The system of claim 13, wherein said predefined persistent memory location comprises a unique value for said first process and said second process.

18. The system of claim 13, wherein said predefined persistent memory location stores an offset to a second memory location where at least a portion of said message is stored.

19. The system of claim 13, wherein said message is persistently stored in said PCIE-linked persistent storage device for an asynchronous checkpoint.

20. The system of claim 13, wherein said message is persistently stored in said PCIE-linked persistent storage device until said message is no longer required for an asynchronous restart.

* * * * *